3,322,719
POLYCARBONATES STABILIZED BY ADDING A BENZOPHENONE OR A BENZOTRIAZOLE TO ACIDIFIED POLYMER
Günter Peilstöcker, Krefeld-Bockum, Germany, assignor to Farbenfabriken Bayer Aktiengesellschaft, Leverkusen, Germany, a corporation of Germany
No Drawing. Filed Nov. 12, 1964, Ser. No. 410,704
Claims priority, application Germany, Nov. 19, 1963, F 41,315
6 Claims. (Cl. 260—45.8)

This invention relates generally to polycarbonates and more particularly to the stabilization of high molecular weight thermoplastic polycarbonates against ultra-violet radiation.

The use of many different types of resins, including polycarbonates, and particularly high molecular weight thermoplastic polycarbonates, has been severely limited heretofore in applications which require these materials to be subjected to weathering which includes ultra-violet light radiation from natural and artificial sources. Such ultra-violet radiation has generally resulted in a severe discoloration of the product, giving it a decidedly yellow cast which is undesirable in most applications for which polycarbonates are generally used, such as, for example, in the manufacture of molded shaped articles, films, filaments, coatings, and the like.

Some synthetic resins such as polyethylene, polypropylene, polyvinyl chloride, polystyrene, polyacrylic and polymethacrylic acid esters and co-polymers, and cellulose esters have been found to be capable of stabilization against the continuous or intermittent harmful action of ultra-violet irradiation from natural or artificial sources by simply having ultra-violet radiation absorbers incorporated therein. Alkoxyhydroxy benzophenones and alkylhydroxyphenyl benzotriazoles, hereinafter referred to as benzophenones and benzotriazole derivatives, such as 2-hydroxy-4-methoxy-benzophenone, 2,2'-dihydroxy-4-methoxy-benzophenone, 2,2'-dihydroxy-4-octoxy-benzophenone, 2-(2'-hydroxy-5'-methyl-phenyl)-benzotriazole, 2-(2'-hydroxy-5'-amyl-phenyl)-benzotriazole, 2,(2'-hydroxy-5'-tert.-butyl-phenyl)-benzotriazole, 2-(2'-hydroxy-3',5'-dimethyl-phenyl)-benzotriazole, and the like and mixtures thereof, when incorporated into these resins at concentrations of from about 0.1 to about 5% by weight, but preferably at concentrations of up to about 2% by weight of the synthetic resin, have been found to possess special utility for the absorption of ultra-violet radiation.

It is a well-known fact, however, that the foregoing ultra-violet radiation absorbers in concentrations necessary for a substantially complete stabilization of a polymer are not suitable for the stabilization of polycarbonates, and particularly high molecular weight thermoplastic polycarbonates (cf. W. F. Christopher and D. W. Fox, "Polycarbonates," Reinhold Plastics Applications Series (1962), Reinhold Publishing Corporation, New York, Chapman and Hall Ltd., London, page 72, third complete paragraph). It is an established fact that if a benzophenone or a benzotriazole is incorporated into a polycarbonate in concentrations of greater than 0.1% by weight, using any of the usual methods used to so incorporate them (such as by dusting or by applying a solution of the stabilizer onto the synthetic resin granules and subsequently homogenizing them in a screw extruder, for example), then there is a reduction in the melt viscosity and the relative viscosity of the polycarbonate corresponding in degree to the amount of stabilizer added. The ultra-violet stabilizers have also been found to cause discoloration and embrittlement of polycarbonates ranging in degree from merely noticeable to marked. Molded articles produced from polycarbonates thus stabilized have also exhibited substantially inferior physico-technical properties, the more significant of which include degradation in the impact strength and the notch impact strength with an increased tendency to stress crack corrosion.

It is therefore an object of this invention to provide a polycarbonate stabilized against the degradative effects of ultra-violet radiation from natural and artificial sources. It is a further object of the invention to provide a process for stabilizing polycarbonates, and especially high molecular weight thermoplastic polycarbonates, against the degradative effects of natural and artificial ultra-violet radiation. A further object of this invention is to provide a process for the preparation of a polycarbonate stabilized against ultra-violet degradation which possesses a high impact strength and a high notch impact strength with substantially no diminished tendency to stress crack corrosion. Yet another object of this invention is to provide a method for the preparation of a polycarbonate stabilized against ultra-violet degradation which possesses all of the properties of unstabilized polycarbonates with respect to ease of processability.

The foregoing objects and other are accomplished in accordance with this invention, generally speaking, by providing a method for making polycarbonate plastics stabilized against the degradative effects of ultra-violet radiation by adding from about 0.1% to about 5% by weight based on the weight of the polycarbonate of a benzophenone or a benzotriazole derivative, or mixtures thereof, to a polycarbonate composition which has been rendered weakly acidic.

Quite unexpectedly, it has been found that high molecular weight thermoplastic polycarbonates can be stabilized against ultra-violet radiation with benzophenones or benzotriazole derivatives in concentrations of greater than 0.1% without being damaged, just as well as any other synthetic resin, if the polycarbonate is rendered weakly acidic beforehand. It has been discovered that the damage heretofore caused by the use of these ultra-violet radiation absorbers in concentrations of greater than 0.1% occurs only in polycarbonates having a neutral or weakly basic pH.

Generally, in the preparation of a polycarbonate by any suitable method such as the melt process, the pyridine process, or the transesterification process as disclosed, for example in U.S. Patent Nos. 3,028,365 and 2,946,766, a distinctly basic polycarbonate is obtained either because of the use of basic catalysts (in the transesterification process), or because of the use of acid binding agents (in the phosgenation process). This basicity is cautiously neutralized in order to keep the polycarbonate from becoming acidic, since acidification generally results in disadvantageous properties such as a degradation of the thermostability of the product and so on. Generally, any suitable method is used to neutralize the basicity of a polycarbonate which will allow an adequate degree of control to prevent the product from becoming acidic. Some such suitable methods include adding exactly measured amounts of base-binding agents to the reaction product of the transesterification process, for example, or, where the phosgenation method is employed, a thorough washing of the polycarbonate solution obtained generally yields a substantially neutral product. The polycarbonate product obtained, therefore, is in every case a neutral or a slightly basic one.

As a consequence, in any previous attempt to stabilize polycarbonates with the ultra-violet radiation absorbing materials enumerated hereinbefore, polycarbonate materials having a neutral or a weakly basic pH were used exclusively. As a consequence, an embrittled and discolored polycarbonate having a reduced viscosity, a reduction in impact strength and notch impact strength, and an increased tendency to stress crack corrosion has been obtained. It is particularly significant, then, that it has now been found that, contrary to previous opinion, weak acidification of a polycarbonate does not result in a product having disadvantageous characteristics, and that, as already mentioned, any damage to the polycarbonate which had been caused heretofore by the incorporation of ultra-violet radiation absorbers into polycarbonate materials does not occur when the polycarbonate material has been weakly acidified beforehand.

The weak acidification of a polycarbonate may be carried out by any suitable method and may even be included as an additional step in the preparation of a polycarbonate product by any suitable method such as hereinbefore defined, or by any other suitable process as disclosed in U.S. Patents 2,999,846; 2,970,131; 2,991,273; 2,999,835; 3,014,891; and 3,017,424; and Canadian Patents 578,585, 578,795, and 594,805. For example, the basicity of a polycarbonate melt product produced by the transesterification process may be slightly overneutralized by the addition of substances which react as a slight acid in the melt. Where basic materials are used to neutralize the polycarbonate solution by the phosgenation process, these materials may in like manner be slightly overneutralized using acids such as hydrochloric acid or preferably, phosphoric acid. In such a case, the operation normally carried out by which any excess acid is completely washed out of the polycarbonate product with water is omitted.

Since, however, such a fine adjustment of the pH is often controlled only with great difficulty during a production process, making the desirable degree of accuracy substantially unobtainable, it is generally more advantageous to first produce a neutral or weakly basic polycarbonate product according to the usual production procedures and to subsequently add the acidifying agents hereinafter referred to as "co-stabilizers."

Any suitable materials may be used to impart the required weak acidity to a neutral or weakly basic polycarbonate, but preferably acids, and esters which behave like acids at elevated temperatures should be used. Some such suitable materials are phosphoric acids and boric acid and their esters as for example o-phosphoric acid, m-phosphoric acid, mono- and diphenyl phosphate, triisooctyl phosphate, tridecyl phosphate, phenyl metaphosphate, the boric acid ester of hexane-1,6-diol, boron phosphate, and the like or mixtures thereof.

A sufficient amount of the above-defined co-stabilizers is from about 0.001% to about 0.5% by weight, preferably from about 0.005 to about 0.01% by weight, depending on the type of polycarbonate used. It is within the discretion of one skilled in the art to determine the optimum amounts of costabilizer to be used within the defined range in each case.

The ultra-violet stabilizing materials may then be added to the weakly acidified polycarbonate composition. Any of the ultra-violet radiation absorbing materials hereinbefore enumerated may be used. Generally, however, alkoxyhydroxy benzophenones having an alkoxy group containing from about 1 to about 8 carbon atoms and having at least one hydroxy group, and alkylhydroxyphenyl benzotriazoles having at least one hydroxyl group and one or two alkyl groups having from about 1 to about 5 carbon atoms attached to the phenyl group may be used.

The ultra-violet radiation absorbing materials may be added to the weakly acidified polycarbonate composition by a number of different methods. For example, powdered or granular polycarbonates may be mixed with the ultra-violet stabilizing materials after which the mixture can be molded or extruded into a desired shape. Additionally, the ultra-violet stabilizing materials may be added to solutions of polycarbonates or to a polycarbonate melt during thermal processing.

A preferred method of mixing the ultra-violet stabilizing materials of this invention with the polycarbonate plastic is to carry out the mixing by intimately blending the two components. This blending can be accomplished by any suitable blending apparatus. The blend can then be extruded in a standard extruder and the resulting strand produced continuously may be reduced to the form of pellets of polycarbonate plastic containing the stabilizer.

In the preferred method of combining a polycarbonate material with any of the ultra-violet stabilizers herein disclosed, a dry blending operation is used in which the polycarbonate in the form of granules is mixed with the ultra-violet stabilizer in a commercial blender or other tumbling apparatus until the stabilizer is coated onto the resin. After blending, the granules can be extruded in a conventional extruder such as a 1½" MPM extruder and pelletized. Further processing of the pellets, such as by injection molding, will produce a polycarbonate product having excellent resistance to ultra-violet degradation in addition to possessing good heat stability, little or no color, and no alteration of the other normal physical properties of polycarbonates.

The combining step is not limited to any particular mixer, blender or temperature and pressure range regardless of the method used for combination, and for most purposes, the above-described, dry-blending technique is adequate. The purpose of combining the ultra-violet stabilizer with the polycarbonate is merely to bring the stabilizer into contact with the polycarbonate prior to producing a finished polycarbonate product and this may be accomplished by any suitable technique.

The polycarbonates thus stabilized may then be used in any application for which polycarbonates are particularly adapted such as in the preparation of films, fibers, coatings, lacquers, the manufacture of various types of shaped articles from baby toys to football helmets, and so on.

The invention is further illustrated but is not intended to be limited by the following examples in which all parts and percentages are by weight unless otherwise specified.

*Examples*

About 10,000 parts of a polycarbonate produced by the transesterification process and having a relative viscosity of about 1.315 (measured as a 0.5% solution in methylene chloride and at a temperature of about 25° C.), are mixed in a mixer with a suspension of about 0.5 part by weight of "co-stabilizer" in a benzene hydrocarbon. After drying the product thus obtained at a temperature of about 120° C. in a vacuum, the mixture is homogenized in a screw extruder, and the bristle material obtained is comminuted to a cylindrical granulate form, which is mixed in a mixer with the amounts of the ultra-violet radiation stabilizers given in Examples 5–9, 11 and 13 of Table 1. In each case, the mixtures obtained are again homogenized in a screw extruder and the bristle obtained is comminuted to a cylindrical granulate form. In a dry state the granular material thus obtained is worked up in an injection molding machine to standard small rods according to German Industrial Standard No. 53,453 with the measurements 50 x 6 x 4 mm. and standard flat rods according to German Industrial Standard No. 53,470 with the measurements 120 x 10 x 4 mm. The rods thus prepared were subjected to a Xeno test, Weather-O-Meter exposure, and outdoor aging; Table 2 collates the data obtained from these tests.

These tables also include experiments carried out using polycarbonates produced by the phosgenization process (Examples 14–17) including examples of polycarbonates which have been washed weakly acidic (Examples 14 and 15), one which has been washed neutral (Example 16) and one which has been washed neutral and mixed with "co-stabilizer" (Example 17).

For a comparative analysis of the test results of the products prepared according to the process of this invention as opposed to polycarbonates prepared without the benefit of the process herein described, the values shown in Table 2 for Examples 5–9, 11, 13–15, and 17 should be referred to the corresponding values for Examples 1–4, 10, 12 and 16.

TABLE 1

| | Polycarbonate from— | U.V. Stabilizer | Weight percent | Co-stabilizer | Weight percent | Relative Viscosity, Test rod | Impact Strength (notched) [cm. kp./cm.²] DIN 53,453 |
|---|---|---|---|---|---|---|---|
| 1 | Bisphenol A (transesterification process) | | | | | 1.308 | 37–45 |
| 2 | ......do...... | 2-(2'-hydroxy-5'-methylphenyl)-benzotriazole | 0.3 | | | 1.288 | 17–26 |
| 3 | ......do...... | ......do...... | 0.6 | | | 1.277 | 11–15 |
| 4 | ......do...... | ......do...... | 2.0 | | | 1.223 | 5–8 |
| 5 | ......do...... | ......do...... | 0.3 | Metaphosphoric acid | 0.005 | 1.307 | 35–40 |
| 6 | ......do...... | ......do...... | 0.6 | ......do...... | 0.005 | 1.302 | 32–37 |
| 7 | ......do...... | ......do...... | 0.6 | Monophenyl phosphate | 0.01 | 1.305 | 32–36 |
| 8 | ......do...... | ......do...... | 0.6 | Tridecyl phosphate | 0.01 | 1.302 | 30–36 |
| 9 | ......do...... | ......do...... | 0.6 | Boron phosphate | 0.005 | 1.300 | 31–37 |
| 10 | ......do...... | 2,2'-dihydroxy-4-methoxy-benzophenone | 0.6 | | | 1.270 | 12–16 |
| 11 | ......do...... | ......do...... | 0.6 | Metaphosphoric acid | 0.005 | 1.298 | 28–36 |
| 12 | ......do...... | 2,2'-dihydroxy-4-n-octoxy benzophenone | 0.6 | | | 1.276 | 11–17 |
| 13 | ......do...... | ......do...... | 0.6 | Metaphosphoric acid | 0.005 | 1.297 | 28–34 |
| 14 | Bisphenol A (phosgenation process) (weakly acidic) | | | | | 1.316 | 37–45 |
| 15 | ......do...... | 2-(2'-hydroxy-5'-methylphenyl)-benzotriazole | 0.6 | | | 1.305 | 30–34 |
| 16 | (Washed neutral) | ......do...... | 0.6 | | | 1.285 | 17–25 |
| 17 | ......do...... | ......do...... | 0.6 | Boron phosphate | 0.005 | 1.302 | 32–40 |

TABLE 2

| Test No. | Non-irradiated | 2,000 hours Xeno test device | 1,150 hours Weather-o-meter | 9 months weathering Central European land climate |
|---|---|---|---|---|
| Light permeability (percent) at 4,200 A.—Sample thickness, 4 mm. | | | | |
| 1 | 77 | 45 | 60 | 60 |
| 6 | 72 | 67 | 71 | 74 |
| Light permeability (percent) at 4,400 A.—Sample thickness, 4 mm. | | | | |
| 1 | 81 | 62 | 74 | 74 |
| 11 | 65 | 61 | 64 | 66 |
| 13 | 70 | 65 | 71 | 72 |
| Light permeability (percent) at 4,200 A.—Sample thickness, 4 mm. | | | | |
| 14 | 81 | 57 | 60 | 58 |
| 17 | 72 | 66 | 69 | 70 |

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A method for stabilizing polycarbonate polymers against the degradative effects of ultraviolet radiation which comprises acidifying the polymer by adding from about 0.001 to about 0.5 part by weight of a co-stabilizer which will impart acidity to the polycarbonate, said co-stabilizers being selected from the group consisting of o-phosphoric acid, m-phosphoric acid, boric acid, monophenyl phosphate, diphenyl phosphate, triisooctyl phosphate, tridecyl phosphate, phenyl metaphosphate, boron phosphate and mixtures thereof, and then adding a stabilizing amount of a member selected from the group consisting of 2-hydroxy-4-methoxy-benzophenone, 2,2'-dihydroxy-4-methoxy-benzophenone, 2,2'-dihydroxy-4-n-octoxy-benzophenone and a 2-(2'-hydroxy-5'-lower alkylphenyl)-benzotriazole.

2. The method of claim 1 in which the group member is 2-(2'-hydroxy-5'-methylphenyl)-benzotriazole.

3. The method of claim 1 in which the group member is 2,2'-dihydroxy-4-methoxy-benzophenone.

4. The method of claim 1 in which the group member is 2,2'-dihydroxy-4-n-octoxy-benzophenone.

5. The method of claim 1 in which the acidifying agent is metaphosphoric acid.

6. A polycarbonate composition stabilized against the degradative effects of ultra-violet radiation prepared by the process of claim 1.

References Cited
UNITED STATES PATENTS 3,074,910  1/1963  Dickson _____ 260—45.8
3,159,646  12/1964  Milionis et al. _____ 260—308
3,201,369  8/1965  Dell et al. _____ 260—45.7

DONALD E. CZAJA, *Primary Examiner.*

LEON J. BERCOVITZ, *Examiner.*

M. J. WELSH, *Assistant Examiner.*